(12) United States Patent  
Nagata et al.

(10) Patent No.: US 11,869,719 B2  
(45) Date of Patent: Jan. 9, 2024

(54) COMPOSITE CAPACITOR

(71) Applicant: Murata Manufacturing Co., Ltd., Nagaokakyo (JP)

(72) Inventors: Masaki Nagata, Nagaokakyo (JP); Yasuhiro Shimizu, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 80 days.

(21) Appl. No.: 17/659,521

(22) Filed: Apr. 18, 2022

(65) Prior Publication Data

US 2022/0238275 A1    Jul. 28, 2022

Related U.S. Application Data

(63) Continuation of application No. PCT/JP2020/026831, filed on Jul. 9, 2020.

(30) Foreign Application Priority Data

Oct. 24, 2019  (JP) ................................ 2019-193614

(51) Int. Cl.
| | |
|---|---|
| *H01G 4/012* | (2006.01) |
| *H01G 4/30* | (2006.01) |
| *H01G 4/38* | (2006.01) |
| *H01G 4/33* | (2006.01) |

(52) U.S. Cl.
CPC ............... *H01G 4/012* (2013.01); *H01G 4/30* (2013.01); *H01G 4/33* (2013.01); *H01G 4/38* (2013.01)

(58) Field of Classification Search  
None  
See application file for complete search history.

(56) References Cited

U.S. PATENT DOCUMENTS

| | | | |
|---|---|---|---|
| 7,691,720 B2 | 4/2010 | Furukawa et al. | |
| 2006/0221548 A1 | 10/2006 | Lee et al. | |
| 2008/0030968 A1* | 2/2008 | Mashino | ................ H05K 1/162 |
| | | | 257/E23.079 |
| 2008/0135908 A1 | 6/2008 | Choi et al. | |

(Continued)

FOREIGN PATENT DOCUMENTS

| | | |
|---|---|---|
| JP | 2003249417 A | 9/2003 |
| JP | 2004146520 A | 5/2004 |

(Continued)

OTHER PUBLICATIONS

International Search Report in PCT/JP2020/026831, dated Sep. 29, 2020, 3 pages.

*Primary Examiner* — Eric W Thomas  
(74) *Attorney, Agent, or Firm* — ArentFox Schiff LLP

(57) ABSTRACT

A composite capacitor that includes a plurality of capacitors and an insulating section. The plurality of capacitors are stacked on each other. The insulating section covers peripheral surfaces of the plurality of capacitors about a central axis of the plurality of capacitors, the stacking direction of the plurality of capacitors being a direction of the central axis. Each of the plurality of capacitors includes a support electrode layer, plural columnar conductors, a dielectric layer, and a counter electrode layer. Each of the plural columnar conductors has a nano-size outer diameter. The plurality of capacitors include a first capacitor and a second capacitor connected in parallel with the first capacitor.

9 Claims, 14 Drawing Sheets

(56) References Cited

U.S. PATENT DOCUMENTS

| | | |
|---|---|---|
| 2009/0000093 A1 | 1/2009 | Sasaki et al. |
| 2009/0180239 A1 | 7/2009 | Oh |
| 2019/0088419 A1 | 3/2019 | Ryou et al. |
| 2019/0148068 A1 | 5/2019 | Lee et al. |

FOREIGN PATENT DOCUMENTS

| | | | |
|---|---|---|---|
| JP | 2006287197 A | | 10/2006 |
| JP | 2008130778 A | | 6/2008 |
| JP | 2009010371 A | | 1/2009 |
| JP | 2009170861 A | | 7/2009 |
| JP | 5511746 B2 | | 6/2014 |
| JP | 2015514315 A | * | 5/2015 |
| JP | 2019057703 A | | 4/2019 |
| JP | 2019091877 A | | 6/2019 |

* cited by examiner

COMPOSITE CAPACITOR

CROSS REFERENCE TO RELATED APPLICATIONS

The present application is a continuation of International application No. PCT/JP2020/026831, filed Jul. 9, 2020, which claims priority to Japanese Patent Application No. 2019-193614, filed Oct. 24, 2019, the entire contents of each of which are incorporated herein by reference.

FIELD OF THE INVENTION

The present invention relates to a composite capacitor.

BACKGROUND OF THE INVENTION

An example of a document that discloses a capacitor including columnar conductors each having a nano-size outer diameter is Japanese Patent No. 5511746 (Patent Document 1). In the capacitor disclosed in Patent Document 1, carbon nanotubes are oriented to extend upward in the substantially vertical direction from a catalyst pad. A dielectric layer is deposited on the catalyst pad. The dielectric layer also covers the outer side portion of each of the carbon nanotubes. A blanket layer made of a conductive material deposited on an insulating substrate fills space between the adjacent carbon nanotubes and also covers the nanotubes, the insulating substrate, and the catalyst pad.

SUMMARY OF THE INVENTION

To increase the electrostatic capacity of the capacitor disclosed in Patent Document 1, the capacitor may be enlarged in the arranging direction of the carbon nanotubes, which serve as the columnar conductors. However, if the electrostatic capacity is increased in this manner, the capacitance density per unit area as viewed from the extending direction of the columnar conductors is not enhanced.

Additionally, in the capacitor disclosed in Patent Document 1, counter electrodes are arranged in the top-down direction. When a plurality of such capacitors are prepared and are stacked on each other, they are connected in series with each other. In a composite capacitor configured as described above, the overall electrostatic capacity is not increased.

The present invention has been made in view of the above-described problems. It is an object of the invention to provide a composite capacitor which can enhance the capacitance density per unit area as viewed from the stacking direction of capacitors and which can also increase the electrostatic capacity.

A composite capacitor according to the present invention includes a plurality of capacitors stacked on each other; and an insulating section that covers peripheral surfaces of the plurality of capacitors about a central axis of the plurality of capacitors, a stacking direction of the plurality of capacitors being a direction of the central axis. Each of the plurality of capacitors includes: a support electrode layer; a plurality of columnar conductors that extend from a side of the support electrode layer along the stacking direction and that each have a nano-size outer diameter; a dielectric layer that covers the support electrode layer and the plurality of columnar conductors; and a counter electrode layer that covers the dielectric layer and that opposes the support electrode layer and the plurality of columnar conductors with the dielectric layer interposed therebetween. The plurality of capacitors include a first capacitor and a second capacitor connected in parallel with the first capacitor.

According to the present invention, in a composite capacitor, the capacitance density per unit area as viewed from the stacking direction of capacitors can be enhanced, and the electrostatic capacity can also be increased.

DETAILED DESCRIPTION OF THE PREFERRED EMBODIMENTS

Figure 1:
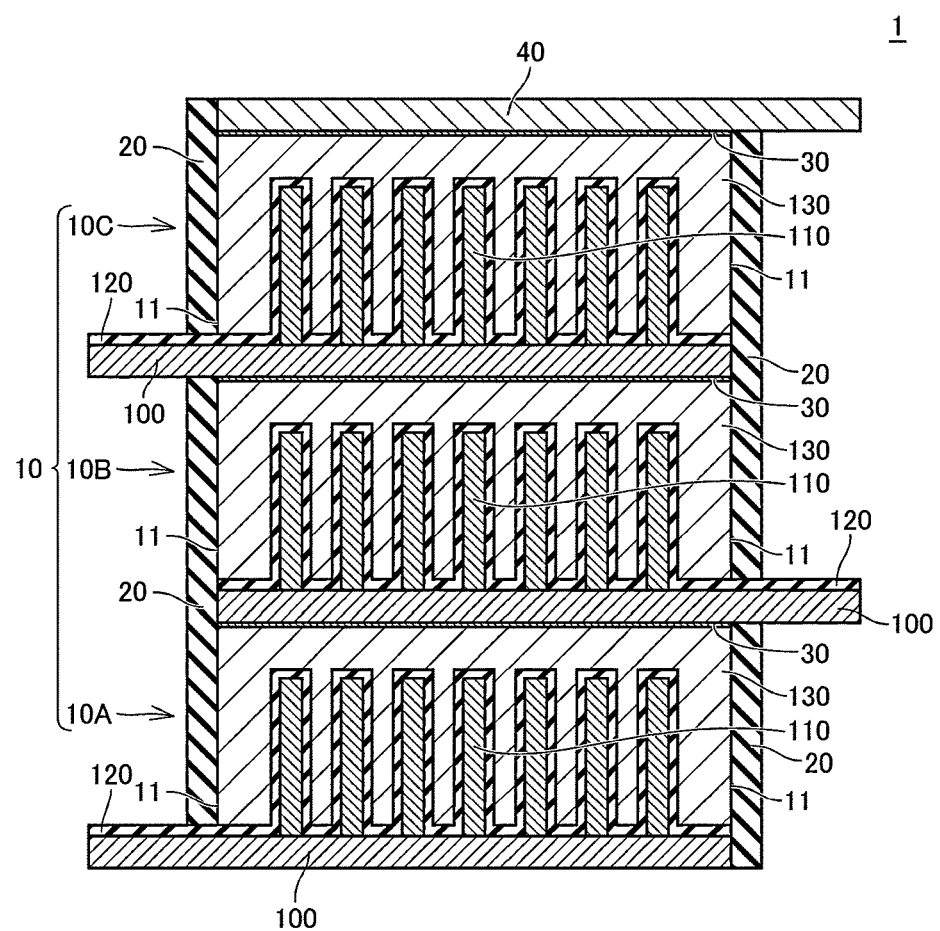
FIG. 1 is a sectional view of a composite capacitor according to a first embodiment of the invention.

Hereinafter, composite capacitors according to individual embodiments of the present invention will be described below with reference to the drawings. In the following description of the embodiments, identical or corresponding elements will be designated by like reference numeral and an explanation thereof will not be repeated.

First Embodiment

FIG. 1 is a sectional view of a composite capacitor according to a first embodiment of the invention. As shown in FIG. 1, a composite capacitor 1 according to the first embodiment of the invention includes plural capacitors 10 and an insulating section 20. The plural capacitors 10 are stacked on each other. The insulating section 20 covers peripheral surfaces 11 of the plural capacitors 10 about the central axis of the plural capacitors 10, assuming that the stacking direction of the plural capacitors 10 is the direction of the central axis.

The configurations of all the plural capacitors 10 are the same and will first be discussed below. As shown in FIG. 1, the plural capacitors 10 each include a support electrode layer 100, plural columnar conductors 110, a dielectric layer 120, and a counter electrode layer 130.

The support electrode layer 100 may be formed in the shape of a plane, foil, or thin film. The support electrode layer 100 formed in a planar shape is easy to handle during the manufacturing of the composite capacitor 1 and the composite capacitor 1 is thus easy to design. The support electrode layer 100 formed in a foil-like shape is easy to handle during the manufacturing of the composite capacitor 1. The support electrode layer 100 formed in a thin-film-like shape can lower the height of the composite capacitor 1.

The external shape and the area of the support electrode layer 100 as viewed from the stacking direction of the plural capacitors 10 can suitably be designed in terms of the electrostatic capacity of the capacitors 10. The external shape of the support electrode layer 100 is a rectangle, a rectangle having curved corners, or an ellipse, as viewed from the above-described stacking direction. A hole may be formed in the support electrode layer 100, as viewed from the above-described stacking direction.

The material forming the support electrode layer 100 is not limited to a particular type. The support electrode layer 100 may be made of a metal, such as copper. If the support electrode layer 100 is made of a metal, a conductive path can be easily formed when the support electrode layer 100 is brought into contact with another conductive member. Additionally, the support electrode layer 100 made of a metal can make its resistance relatively low and also improve its heat resistance.

The support electrode layer 100 may include wiring, which is used for forming a conductive path by connecting the support electrode layer 100 to another conductive member such as the plural columnar conductors 110. If the support electrode layer 100 includes wiring, the portion of the support electrode layer 100 other than the wiring may be formed of an insulating material, such as a ceramic material. If the portion of the support electrode layer 100 other than the wiring is formed of a ceramic material, the mechanical characteristics of the support electrode layer 100 are enhanced.

The plural columnar conductors 110 are each supported by the support electrode layer 100. At one side of the support electrode layer 100 in the stacking direction, each of the plural columnar conductors 110 extends from the support electrode layer 100 along the stacking direction. Although in this embodiment each of the plural columnar conductors 110 extends from the surface of the support electrode layer 100, it may extend outwardly from the inside of the support electrode layer 100. Additionally, although in this embodiment each of the plural columnar conductors 110 is formed of a member different from the support electrode layer 100, it may be formed of a uniform member together with the support electrode layer 100.

Each of the plural columnar conductors 110 has a nano-size outer diameter. In the present specification, the nano size is 0.1 nm to 1000 nm, for example. Each of the plural columnar conductors 110 may have a cylindrical shape or a cylindrical shape with a closed bottom.

The material forming the plural columnar conductors 110 is not limited to a particular type. In this embodiment, the plural columnar conductors 110 are made of a conductive material or a semiconductor material. However, the plural columnar conductors 110 may be formed of columnar members made of a semiconductor material or insulating material thinly coated with a metal.

Each of the plural columnar conductors 110 includes, for example, carbon nanofibers, another type of nanofibers made of ZnO, for example, or nanorods or nanowires made of ZnO, GaN, or hematite. In this embodiment, specifically, the plural columnar conductors 110 are formed of carbon nanotubes, and more specifically, each of the plural columnar conductors 110 is formed of multiple, for example, 100 to 200, carbon nanotubes.

In this embodiment, the chirality of the carbon nanotubes is not limited to a particular type. The carbon nanotubes may be of a semiconductor type or a metal type. The carbon nanotubes may include both of nanotubes of a semiconductor type and those of a metal type. From the viewpoint of the electrical resistance, the carbon nanotubes preferably have a higher ratio of nanotubes of a metal type than those of a semiconductor type.

In this embodiment, the number of layers forming the carbon nanotubes is not particularly restricted. The carbon nanotubes may be of a SWCNT (Single Wall Carbon Nanotube) type formed of one layer or of a MWCNT (Multiwall Carbon Nanotube) type formed of two or more layers.

The length of each of the plural columnar conductors 110 is not particularly limited. The length of each of the plural columnar conductors 110 is preferably long from the viewpoint of the capacitance density per unit area in the planar direction perpendicular to the extending direction of the plural columnar conductors 110. The length of each of the plural columnar conductors 110 is several micrometers or longer, 20 μm or longer, 50 μm or longer, 100 μm or longer, 500 μm or longer, 750 μm or longer, 1000 μm or longer, or 2000 μm or longer, for example.

The lengths of the plural columnar conductors 110 may be different from each other. The forward ends of the plural columnar conductors 110 are preferably aligned on a virtual plane substantially perpendicular to the stacking direction. This configuration can easily control the electrostatic capacity of the capacitor 10.

At the above-described side of the support electrode layer 100 in the stacking direction, the dielectric layer 120 covers the support electrode layer 100 and the plural columnar conductors 110. The dielectric layer 120 covers the entire surface of the support electrode layer 100 on the side of the plural columnar conductors 110, except for the portions on which the plural columnar conductors 110 are disposed.

An additional conductor layer may be disposed between the dielectric layer 120 and the plural columnar conductors 110. This can further reduce the parasitic resistance of the capacitor 10.

The material forming the dielectric layer 120 is not limited to a particular type. Examples of the material are silicon dioxide, aluminum oxide, silicon nitride, tantalum oxide, hafnium oxide, barium titanate, lead zirconate titanate, and a combination thereof.

The counter electrode layer 130 covers the dielectric layer 120 and opposes the support electrode layer 100 and the plural columnar conductors 110 with the dielectric layer 120 interposed therebetween. In this embodiment, a surface of the counter electrode layer 130, which is the opposite side of the counter electrode layer 130 as viewed from the support electrode layer 100, has a planar shape.

The material forming the counter electrode layer 130 is not limited to a particular type, and may be a metal, such as silver, gold, copper, platinum, aluminum, or an alloy thereof.

The overall configuration of the composite capacitor 1 will now be discussed below.

In the composite capacitor 1 according to the present embodiment, the plural capacitors 10 include a first capacitor 10A, a second capacitor 10B, and a third capacitor 10C.

The second capacitor 10B is located on one side of the first capacitor 10A, which is one side in the stacking direction of the plural capacitors 10 and which is the extending side of the plural columnar conductors 110. In this embodiment, the counter electrode layer 130 of the first capacitor 10A, which is one of the plural capacitors 10, is electrically connected directly to the support electrode layer 100 of the second capacitor 10B, which is another capacitor 10 positioned most closely to the first capacitor 10A at the side of the counter electrode layer 130 of the first capacitor 10A in the stacking direction. The counter electrode layer 130 of the first capacitor 10A and the support electrode layer 100 of the second capacitor 10B are bonded to each other only with a conductive adhesive 30 interposed therebetween.

The third capacitor 10C is located on one side of the second capacitor 10B, which is one side in the stacking direction of the plural capacitors 10 and which is the extending side of the plural columnar conductors 110. In this embodiment, the counter electrode layer 130 of the second capacitor 10B, which is one of the plural capacitors 10, is electrically connected directly to the support electrode layer 100 of the third capacitor 10C, which is another capacitor 10 positioned most closely to the second capacitor 10B at the above-described side of the counter electrode layer 130 of the second capacitor 10B in the stacking direction. The counter electrode layer 130 of the second capacitor 10B and the support electrode layer 100 of the third capacitor 10C are bonded to each other only with a conductive adhesive 30 interposed therebetween.

The support electrode layer 100 of the first capacitor 10A, which is one of the plural capacitors 10, and the dielectric layer 120 covering this support electrode layer 100 extend to cut out an end portion of the insulating section 20 and further extend to the opposite side of the insulating section 20 as viewed from the capacitor 10.

The support electrode layer 100 of the second capacitor 10B, which is one of the plural capacitors 10, and the dielectric layer 120 covering this support electrode layer 100 pass through the insulating section 20 and extend to the opposite side of the insulating section 20 as viewed from the capacitor 10. In this embodiment, the extending direction of the support electrode layer 100 and the dielectric layer 120 of the second capacitor 10B is different from that of the support electrode layer 100 and the dielectric layer 120 of the first capacitor 10A.

The support electrode layer 100 of the third capacitor 10C, which is one of the plural capacitors 10, and the dielectric layer 120 covering this support electrode layer 100 pass through the insulating section 20 and extend to the opposite side of the insulating section 20 as viewed from the capacitor 10. In this embodiment, the extending direction of the support electrode layer 100 and the dielectric layer 120 of the third capacitor 10C is substantially the same as that of the support electrode layer 100 and the dielectric layer 120 of the first capacitor 10A.

The composite capacitor 1 according to the present embodiment further includes a top-surface electrode layer 40. The configuration of the top-surface electrode layer 40 is similar to that of the support electrode layer 100. The top-surface electrode layer 40 is electrically connected directly to the counter electrode layer 130 of the third capacitor 10C, which is the capacitor 10 positioned farther toward the above-described side in the stacking direction than the other capacitors 10. The top-surface electrode layer 40 is located at the opposite side of the counter electrode layer 130 as viewed from the support electrode layer 100. The counter electrode layer 130 of the third capacitor 10C and the top-surface electrode layer 40 are bonded to each other only with a conductive adhesive 30 interposed therebetween.

The top-surface electrode layer 40 extends to cut out an end portion of the insulating section 20 and further extends to the opposite side of the insulating section 20 as viewed from the capacitor 10. In this embodiment, the extending direction of the top-surface electrode layer 40 is substantially the same as that of the support electrode layer 100 and the dielectric layer 120 of the second capacitor 10B.

Figure 2:
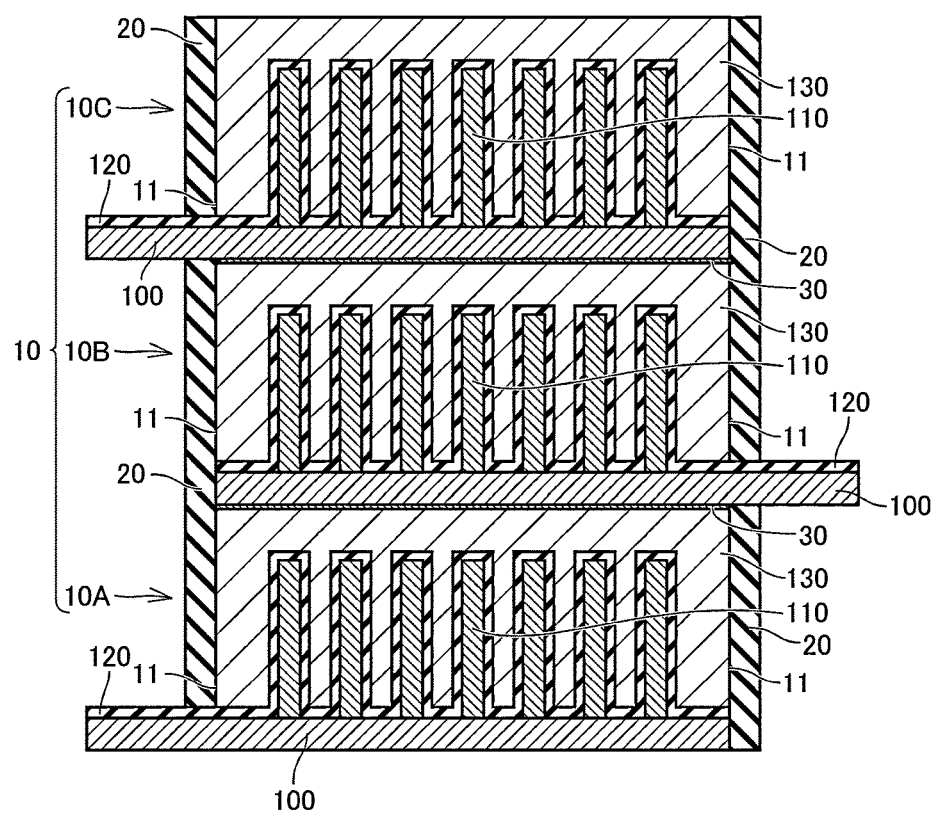
FIG. 2 is a sectional view of a composite capacitor according to a modified example of the first embodiment of the invention.

It may be possible that the composite capacitor 1 according to the first embodiment of the invention does not include the top-surface electrode layer 40. FIG. 2 is a sectional view of a composite capacitor according to a modified example of the first embodiment of the invention. As shown in FIG. 2, a composite capacitor 1a according to the modified example of the first embodiment of the invention does not include a top-surface electrode layer. In the composite capacitor 1a of this modified example, the counter electrode layer 130 of the third capacitor 10C is exposed to the exterior.

The circuit constituted by the three capacitors 10 included in the composite capacitor 1 according to the first embodiment of the invention will be explained below upon comparison with a composite capacitor according to a comparative example.

Figure 3:
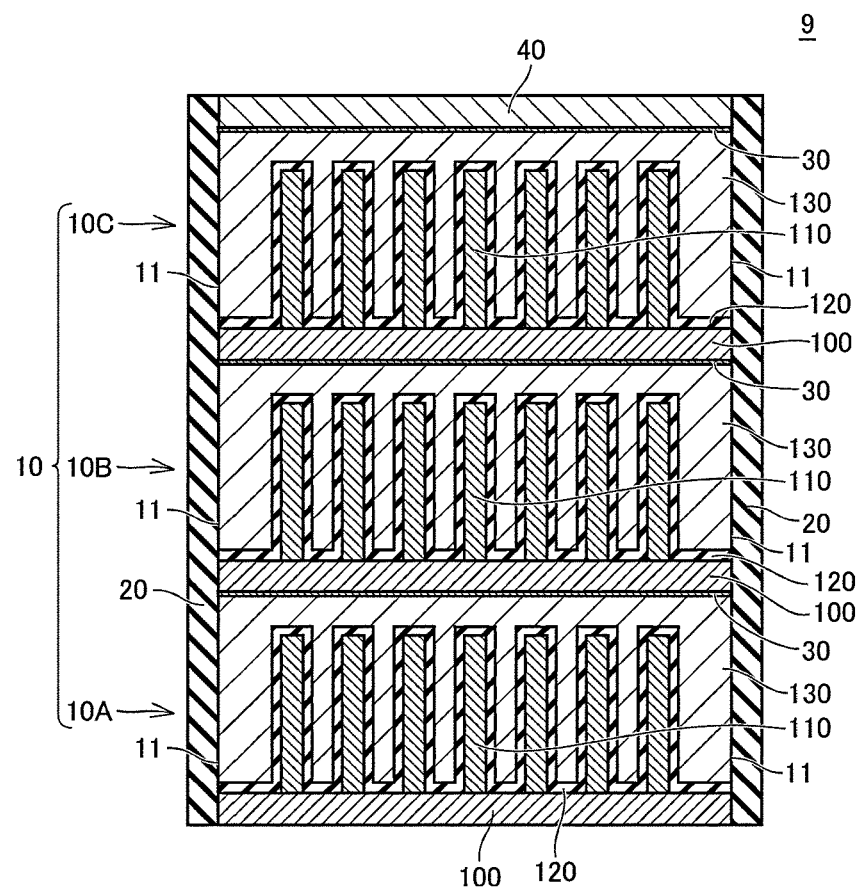
FIG. 3 is a sectional view of a composite capacitor according to a comparative example.

FIG. 3 is a sectional view of a composite capacitor according to the comparative example. As shown in FIG. 3, a composite capacitor 9 according to the comparative example is different from the composite capacitor 1 according to the first embodiment of the invention in that the support electrode layers 100, the dielectric layers 120, and the top-surface electrode layer 40 do not extend to opposite sides of the insulating section 20 as viewed from the capacitors 10.

In the composite capacitor 9 according to the comparative example, if the support electrode layer 100 of the first capacitor 10A is used as one terminal and the top-surface electrode layer 40 is used as the other terminal, a circuit is formed from one terminal to the other terminal. In this circuit, the plural capacitors 10 are connected in series with each other. That is, in the composite capacitor 9 according to the comparative example, the first capacitor 10A, the second capacitor 10B, and the third capacitor 10C are not connected in parallel with each other.

In contrast, in the composite capacitor 1 according to the first embodiment of the invention, as shown in FIG. 1, the support electrode layer 100 of the first capacitor 10A and that of the third capacitor 10C are electrically connected to each other so as to be used as one terminal. The support electrode layer 100 of the second capacitor 10B and the top-surface electrode layer 40 are electrically connected to each other so as to be used as the other terminal.

In the circuit formed from one terminal to the other terminal of the composite capacitor 1 of this embodiment, the second capacitor 10B is connected in parallel with the first capacitor 10A, while the third capacitor 10C is connected in parallel with each of the first capacitor 10A and the second capacitor 10B. In this manner, in the composite capacitor 1 according to the present embodiment, the three capacitors 10 can be represented by three parallel-connection arrangements×one series-connection arrangement.

Hereinafter, the manufacturing method for the composite capacitor 1 according to the first embodiment of the invention will be described below. The manufacturing method for the composite capacitor 1 is not restricted to a particular method. The manufacturing method for the composite capacitor 1 according to the first embodiment of the invention includes a step of forming columnar conductors on a substrate, a step of transferring the columnar conductors to a collective support electrode layer, a step of applying a dielectric layer, a step of applying a counter electrode layer, a step of flattening the counter electrode layer, a step of dividing the counter electrode layer, a step of dividing each of the collective support electrode layer and the dielectric layer, a step of providing an insulating section, and a stacking step.

Figure 4:
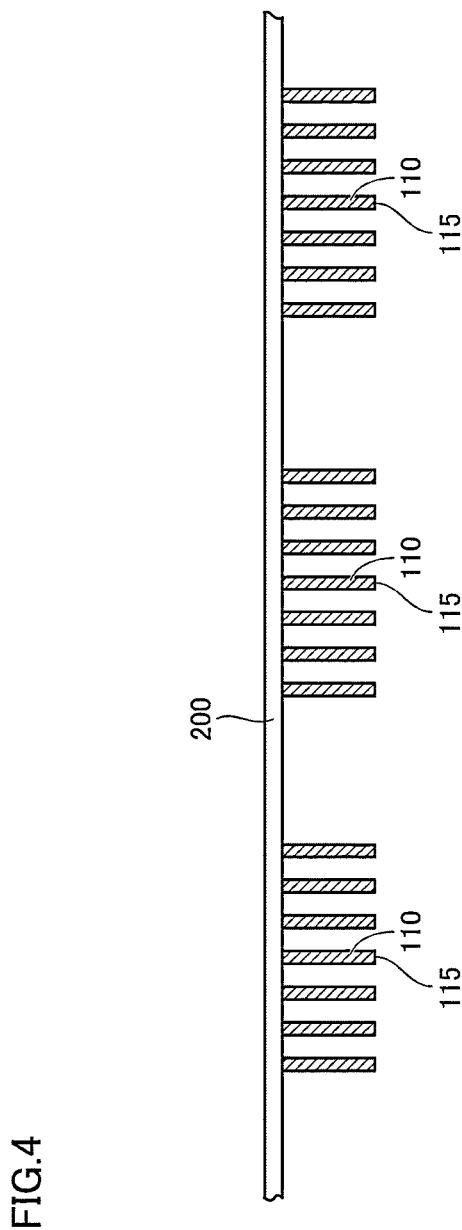
FIG. 4 is a sectional view illustrating a state in which plural columnar conductors are formed on a substrate in a manufacturing method for the composite capacitor according to the first embodiment of the invention.

FIG. 4 is a sectional view illustrating a state in which plural columnar conductors are formed on a substrate in the manufacturing method for the composite capacitor according to the first embodiment of the invention. As shown in FIG. 4, plural columnar conductors 110 are first formed on a substrate 200. More specifically, catalyst particles are disposed on the substrate 200 and the columnar conductors 110 are grown from the catalyst particles. The plural columnar conductors 110 each have an end portion 115 at the opposite side of the columnar conductor 110 as viewed from the substrate 200.

If the columnar conductors 110 are carbon nanotubes, the catalyst particles are made of Fe, Ni, Co, or an alloy thereof, for example. If the columnar conductors 110 contain ZnO, the catalyst particles are made of Pt, Au, or an alloy thereof. To dispose the catalyst particles, a combination of one of CVD (Chemical Vapor Deposition), sputtering, and PVD (Physical Vapor Deposition) and one of lithography and etching may be used. The position of the catalyst particles is suitably selected by patterning.

The process for growing the columnar conductors 110 is not restricted to a particular process. In this embodiment, the plural columnar conductors 110 can be grown by CVD or plasma-enhanced CVD, for example. A gas used in CVD or plasma-enhanced CVD may be carbon monoxide, methane, ethylene, acetylene, or a mixture of such a compound and hydrogen or ammonia.

Each of the plural columnar conductors 110 is grown from the surface of the catalyst particles. Each of the plural columnar conductors 110 is grown such that the end portion 115 is separated from the substrate 200.

When the plural columnar conductors 110 are grown with the above-described CVD or plasma-enhanced CVD, for example, if conditions such as the temperature condition and the gas condition are suitably selected, each of the plural columnar conductors 110 can be formed to have a length within a desired range and an outer diameter within a desired range. The specific lengths of the plural columnar conductors 110 become different from each other depending on the gas concentration, gas flow rate, and temperature variations on the surface of the substrate 200.

Examples of the material forming the substrate 200 are silicon oxide, silicon, gallium arsenide, aluminum, and SUS.

Figure 5:
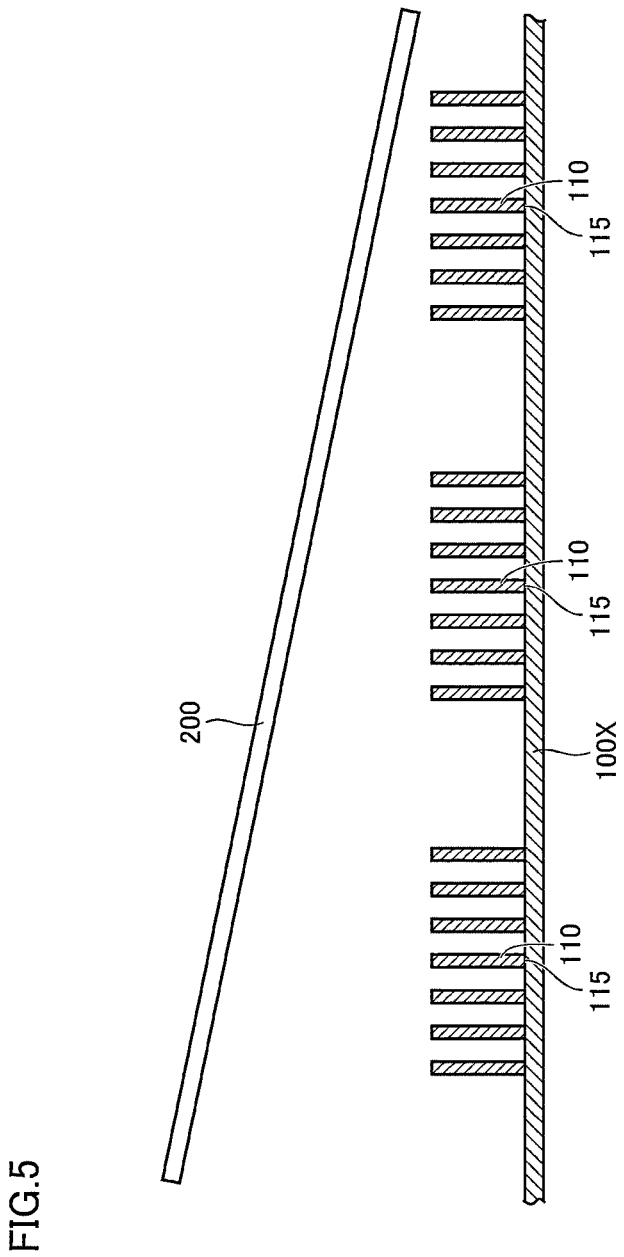
FIG. 5 is a sectional view illustrating a state in which the plural columnar conductors are transferred from the substrate to a collective support electrode layer in the manufacturing method for the composite capacitor according to the first embodiment of the invention.

FIG. 5 is a sectional view illustrating a state in which the plural columnar conductors are transferred from the substrate to a collective support electrode layer in the manufacturing method for the composite capacitor according to the first embodiment of the invention. As shown in FIG. 5, the plural columnar conductors 110 formed on the substrate 200 are bonded at their end portions 115 onto a collective support electrode layer 100X. After the plural columnar conductors 110 are bonded to the collective support electrode layer 100X, the substrate 200 is removed from the plural columnar conductors 110. In this manner, the plural columnar conductors 110 are transferred from the substrate 200 to the collective support electrode layer 100X. The collective support electrode layer 100X is a collective body of the support electrode layers 100 of the plural capacitors 10. More specifically, the collective support electrode layer 100X is in a state in which the plural support electrode layers 100 are connected with each other in the in-plane direction.

The plural columnar conductors 110 may be transferred from the substrate 200 to the collective support electrode layer 100X by chemically or mechanically inserting the plural columnar conductors 110 into the collective support electrode layer 100X. With this approach, the lengths of the plural columnar conductors 110 extending from the support electrode layer 100 to the exterior can be made uniform.

If each of the plural columnar conductors 110 is formed of a uniform member together with the support electrode layer 100, instead of the above-described process, one planar electrode layer may be used and the surface of the planar electrode layer may be processed in an uneven form by chemical etching, for example, thereby forming the plural columnar conductors 110 and the collective support electrode layer 100X.

Figure 6:
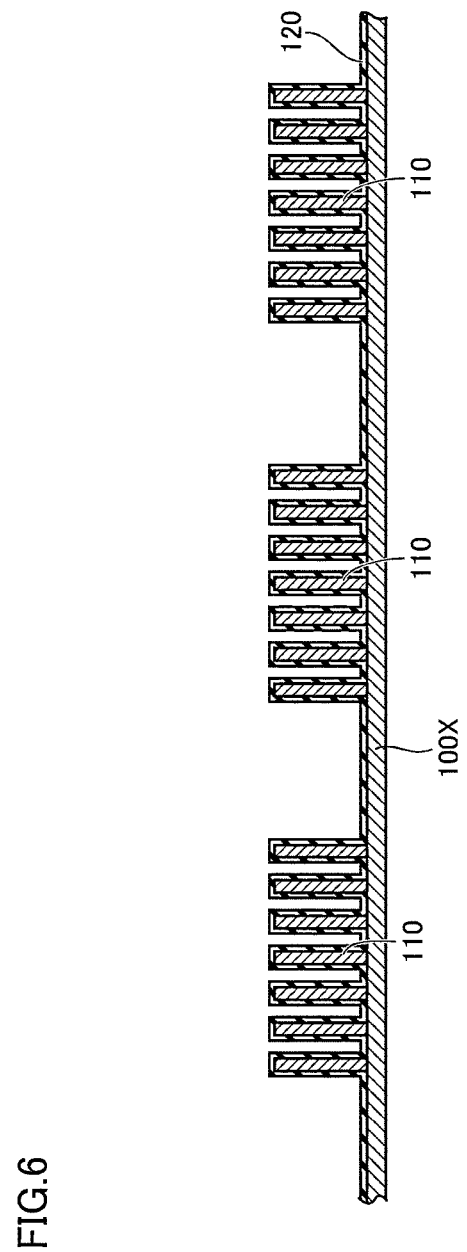
FIG. 6 is a sectional view illustrating a state in which the collective support electrode layer and the plural columnar conductors are coated with a dielectric layer in the manufacturing method for the composite capacitor according to the first embodiment of the invention.

FIG. 6 is a sectional view illustrating a state in which the collective support electrode layer and the plural columnar conductors are coated with a dielectric layer in the manufacturing method for the composite capacitor according to the first embodiment of the invention. As shown in FIG. 6, the dielectric layer 120 is applied to the entire surface of the collective support electrode layer 100X on which the plural columnar conductors 110 are disposed. The process for applying the dielectric layer 120 is not restricted to a particular process, and plating, ALD (Atomic Layer Deposition), CVD, MOCVD (Metalorganic Chemical Vapor Deposition), supercritical fluid film deposition, or sputtering, for example, may be used.

Figure 7:
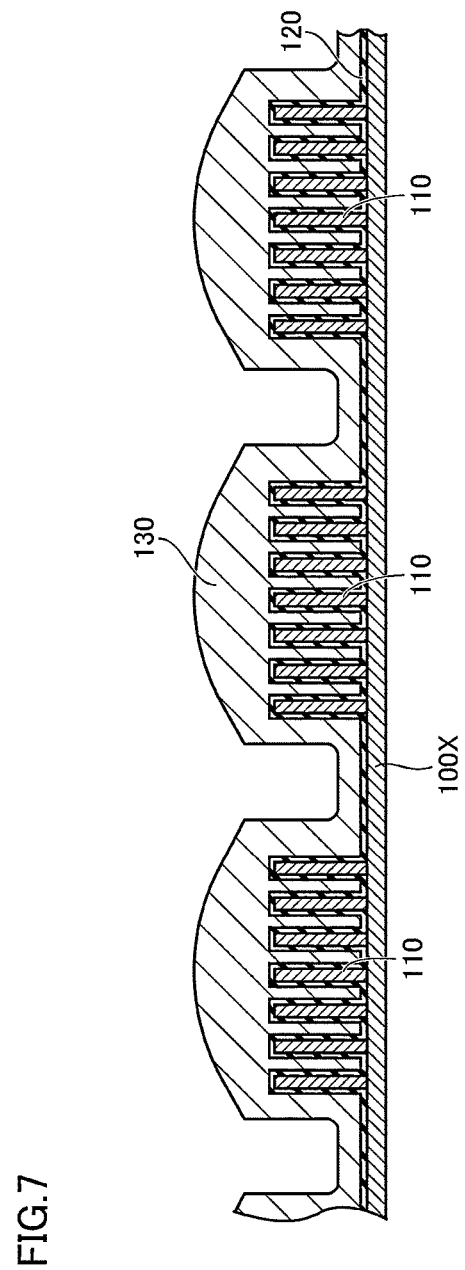
FIG. 7 is a sectional view illustrating a state in which the dielectric layer is coated with a counter electrode layer in the manufacturing method for the composite capacitor according to the first embodiment of the invention.

FIG. 7 is a sectional view illustrating a state in which the dielectric layer is coated with a counter electrode layer in the manufacturing method for the composite capacitor according to the first embodiment of the invention. As shown in FIG. 7, the counter electrode layer 130 is applied onto the dielectric layer 120. The process for applying the counter electrode layer 130 is not restricted to a particular process, and plating, ALD, CVD, MOCVD, supercritical fluid film deposition, or sputtering, for example, may be used.

Figure 8:
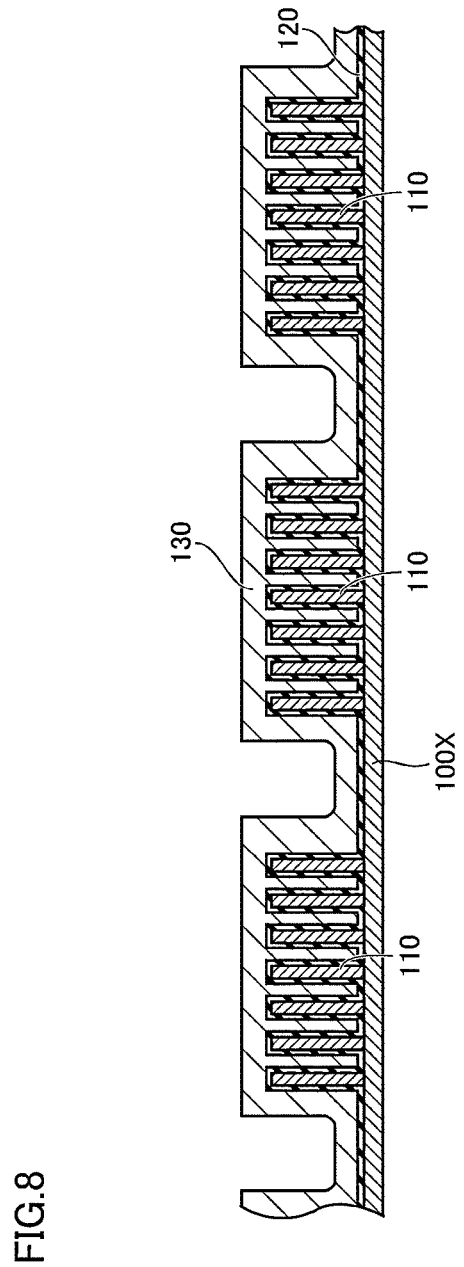
FIG. 8 is a sectional view illustrating a state in which the counter electrode layer is flattened in the manufacturing method for the composite capacitor according to the first embodiment of the invention.

FIG. 8 is a sectional view illustrating a state in which the counter electrode layer is flattened in the manufacturing method for the composite capacitor according to the first embodiment of the invention. As shown in FIG. 8, a portion of the counter electrode layer 130, which is the opposite side of the counter electrode layer 130 as viewed from the collective support electrode layer 100X on which the plural columnar conductors 110 are formed, is flattened by CMP (Chemical Mechanical Polishing).

Figure 9:
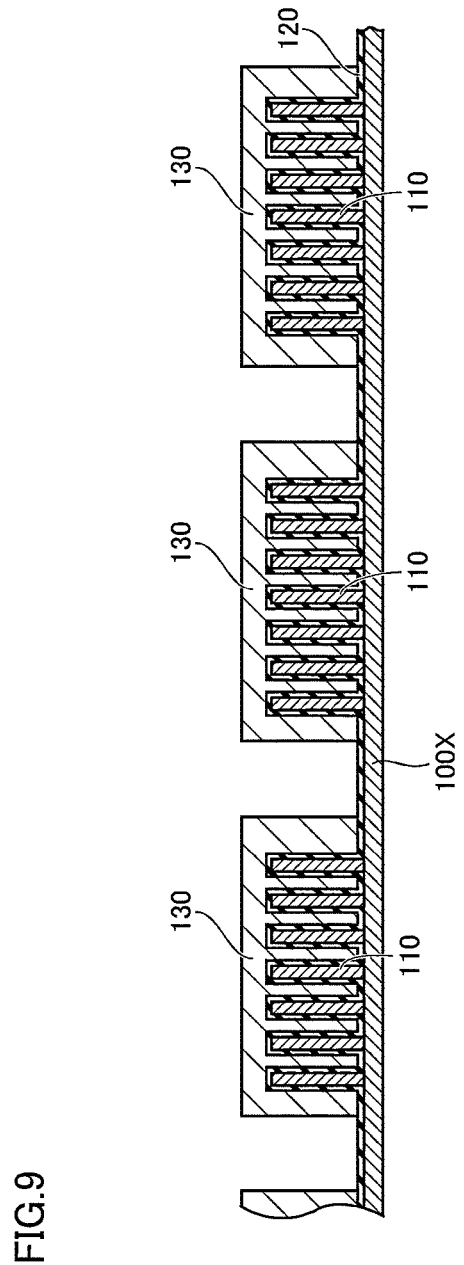
FIG. 9 is a sectional view illustrating a state in which the counter electrode layer is divided in the manufacturing method for the composite capacitor according to the first embodiment of the invention.

FIG. 9 is a sectional view illustrating a state in which the counter electrode layer is divided in the manufacturing method for the composite capacitor according to the first embodiment of the invention. As shown in FIG. 9, the plural columnar conductors 110 are split into multiple groups, and the counter electrode layer 130 is divided into multiple counter electrode layers 130 so that the divided counter electrode layers 130 are separated from each other in accordance with the multiple groups of the plural columnar conductors 110. The dielectric layer 120 positioned between the plural counter electrode layers 130 is exposed. Dividing of the counter electrode layer 130 is performed by photomasking and etching.

Figure 10:
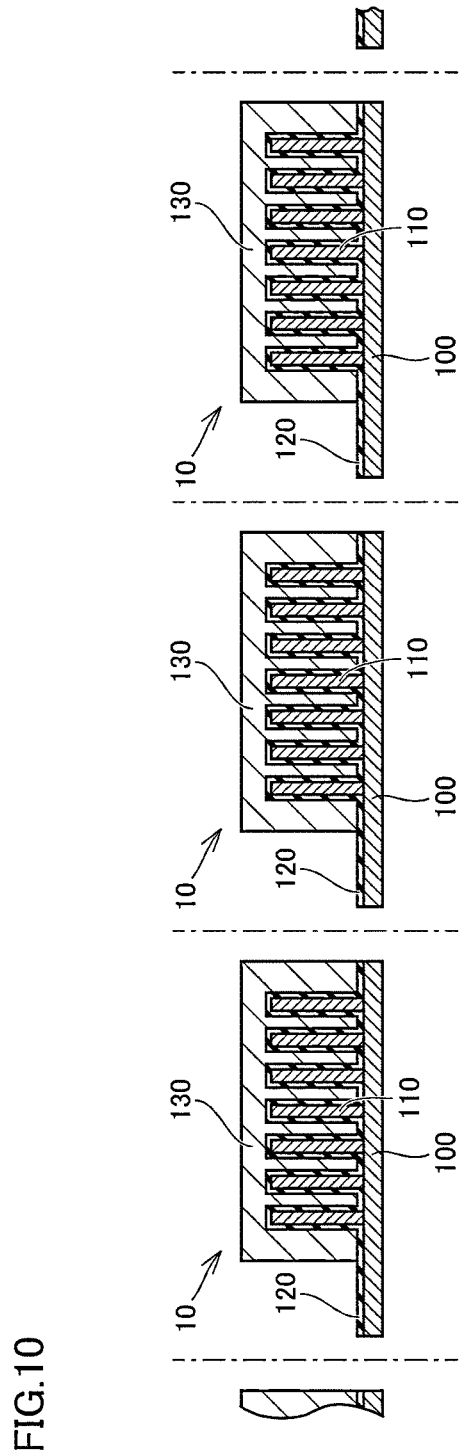
FIG. 10 is a sectional view illustrating a state in which each of the collective support electrode layer and the dielectric layer is divided in the manufacturing method for the composite capacitor according to the first embodiment of the invention.

FIG. 10 is a sectional view illustrating a state in which each of the collective support electrode layer and the dielectric layer is divided in the manufacturing method for the composite capacitor according to the first embodiment of the invention. As shown in FIG. 10, at positions at which the dielectric layer 120 is exposed, the collective support electrode layer 100X and the dielectric layer 120 are cut with a dicing machine and divided. This can form the plural capacitors 10 in association with the plural support electrode layers 100 formed by dividing the collective support electrode layer 100X. The collective support electrode layer 100X and the dielectric layer 120 are divided so that each support electrode layer 100 and each dielectric layer 120 extend in one direction of the capacitors 10.

Figure 11:
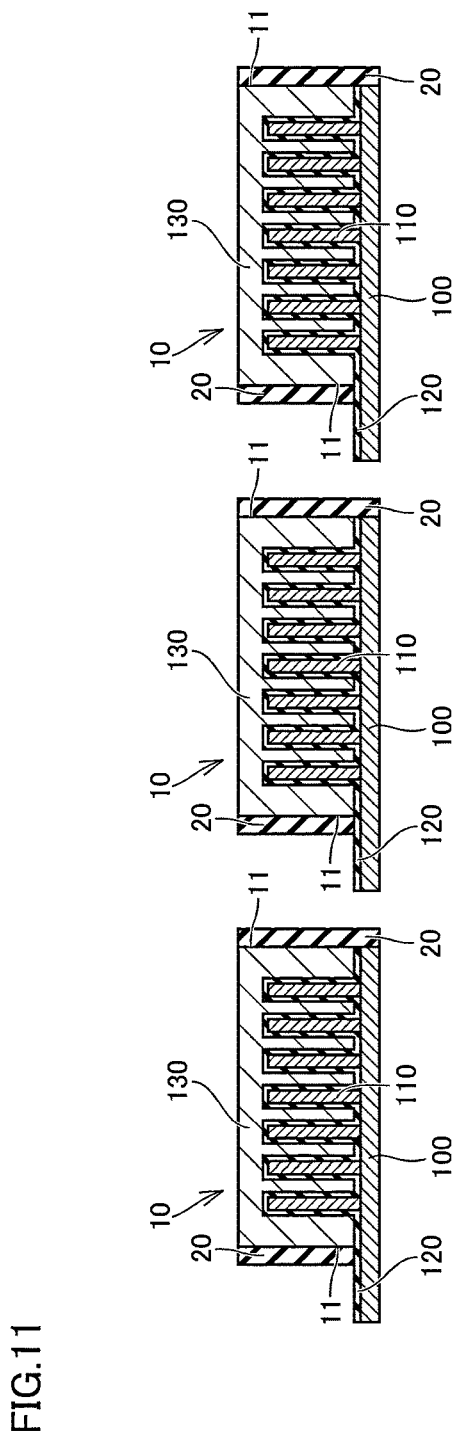
FIG. 11 is a sectional view illustrating a state in which an insulating section is provided for each of the plural capacitors in the manufacturing method for the composite capacitor according to the first embodiment of the invention.

FIG. 11 is a sectional view illustrating a state in which an insulating section is provided for each of the plural capacitors in the manufacturing method for the composite capacitor according to the first embodiment of the invention. As shown in FIG. 11, the insulating section 20 is disposed on the peripheral surface 11 of each of the plural capacitors 10. The process for providing the insulating section 20 is not restricted to a particular process, and plating, ALD, CVD, MOCVD, supercritical fluid film deposition, or sputtering, for example, may be used. Alternatively, the insulating section 20 may be provided by applying a paste base including an insulating material to the peripheral surface 11 of each capacitor 10 and then by firing the paste base.

Lastly, the plural capacitors 10 provided with the insulating section 20 and the top-surface electrode layer 40 are stacked on each other with a conductive adhesive 30 interposed between. As a result, the composite capacitor according to the first embodiment of the invention, such as that shown in FIG. 1, is manufactured. Before providing the insulating section 20 for each of the plural capacitors 10, the capacitors 10 may be stacked on each other, and then, the insulating section 20 may be provided for the plural capacitors 10 stacked on each other. In the stacking step, if the plural capacitors 10 provided with the insulating section 20 are merely stacked on each other with a conductive adhesive 30 interposed therebetween, the composite capacitor 1a according to the modified example of the first embodiment of the invention is manufactured.

As described above, the composite capacitor 1 according to the first embodiment of the invention includes the plural capacitors 10 and the insulating section 20. The plural capacitors 10 are stacked on each other. The insulating section 20 covers the peripheral surfaces 11 of the plural capacitors 10 about the central axis of the plural capacitors 10, assuming that the stacking direction of the plural capacitors 10 is the direction of the central axis. Each of the plural capacitors 10 includes the support electrode layer 100, the plural columnar conductors 110, the dielectric layer 120, and the counter electrode layer 130. At one side of the support electrode layer 100 in the stacking direction, each of the plural columnar conductors 110 extends from the support electrode layer 100 along the stacking direction. Each of the plural columnar conductors 110 has a nano-size outer diameter. At the above-described side of the support electrode layer 100, the dielectric layer 120 covers the support electrode layer 100 and the plural columnar conductors 110. The counter electrode layer 130 covers the dielectric layer 120 and opposes the support electrode layer 100 and the plural columnar conductors 110 with the dielectric layer 120 interposed therebetween. The plural capacitors 10 include the first capacitor 10A and the second capacitor 10B. The second capacitor 10B is located at the above-described side of the first capacitor 10A in the stacking direction. The second capacitor 10B is connected in parallel with the first capacitor 10A.

With this configuration, the composite capacitor 1 can enhance the capacitance density per unit area as viewed from the stacking direction of the capacitors 10 and also increase the electrostatic capacity.

In the composite capacitor 1 according to the present embodiment, the support electrode layer 100 of at least one of the plural capacitors 10 passes through the insulating section 20 and extends to the opposite side of the insulating section 20 as viewed from the capacitor 10.

With this configuration, the extending support electrode layer 100 can be used as a terminal of the composite capacitor 1 so as to connect plural capacitors 10 in parallel with each other.

In the composite capacitor 1 according to the present embodiment, the counter electrode layer 130 of at least a certain one of the plural capacitors 10 is electrically connected to the support electrode layer 100 of a different capacitor 10 which is positioned most closely to the above-described certain one of the capacitors 10 at the above-described side of the counter electrode layer 130 in the stacking direction.

With this configuration, inside the insulating section 20, the electrode layers of plural capacitors 10 can be electrically connected to each other.

In the composite capacitor 1 according to the present embodiment, the support electrode layer 100 of the above-described different capacitor 10 passes through the insulating section 20 and extends to the opposite side of the insulating section 20 as viewed from the different capacitor 10.

With this configuration, the counter electrode layer 130 of the above-described certain one of the capacitors 10 can be used as a terminal of the composite capacitor 1 via the extending support electrode layer 100 of the above-described different capacitor 10 so as to connect plural capacitors 10 in parallel with each other.

In the composite capacitor 1 according to the present embodiment, the plural columnar conductors 110 are formed of carbon nanotubes.

This can improve the mechanical characteristics of the plural columnar conductors 110. Hence, when the plural capacitors 10 are stacked on each other, the structure of the capacitors 10 is less likely to change and the electrostatic capacity of the composite capacitor 1 is less likely to decrease.

Second Embodiment

Hereinafter, a composite capacitor according to a second embodiment of the invention will be described below. The composite capacitor according to the second embodiment of the invention is different from the composite capacitor 1 according to the first embodiment of the invention mainly in that some of plural capacitors are connected in series with each other. An explanation of elements configured similarly to those of the first embodiment of the invention will not be repeated.

Figure 12:
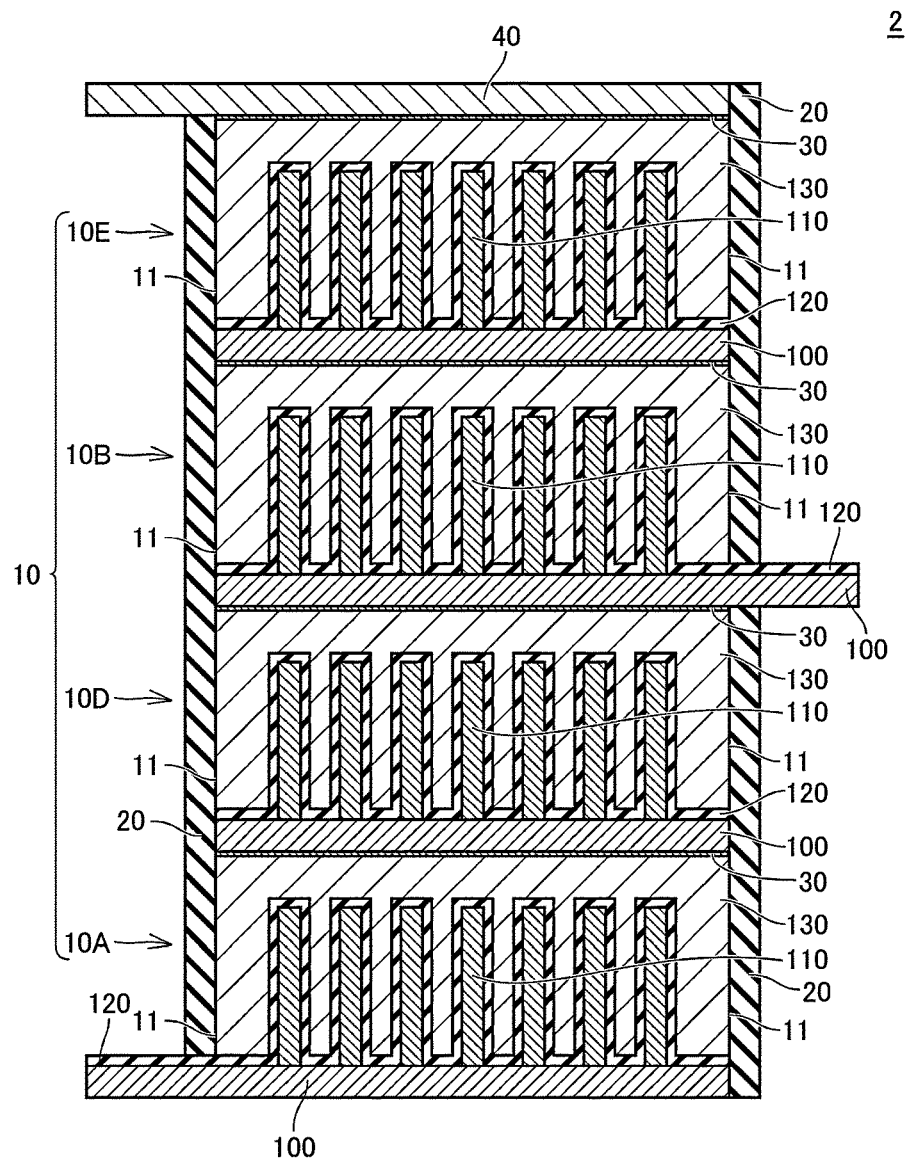
FIG. 12 is a sectional view of a composite capacitor according to a second embodiment of the invention.

FIG. 12 is a sectional view of a composite capacitor according to the second embodiment of the invention. As shown in FIG. 12, in a composite capacitor 2 according to the second embodiment of the invention, plural capacitors 10 include a first capacitor 10A, a second capacitor 10B, a fourth capacitor 10D, and a fifth capacitor 10E.

The fourth capacitor 10D is located on one side of the first capacitor 10A, which is one side in the stacking direction of the plural capacitors 10 and which is the extending side of the plural columnar conductors 110. In this embodiment, the counter electrode layer 130 of the first capacitor 10A, which is one of the plural capacitors 10, is electrically connected directly to the support electrode layer 100 of the fourth capacitor 10D, which is another capacitor 10 positioned most closely to the first capacitor 10A at the side of the counter electrode layer 130 of the first capacitor 10A in the stacking direction. The counter electrode layer 130 of the first capacitor 10A and the support electrode layer 100 of the fourth capacitor 10D are bonded to each other only with a conductive adhesive 30 interposed therebetween.

The second capacitor 10B is located on one side of the fourth capacitor 10D, which is one side in the stacking direction of the plural capacitors 10 and which is the extending side of the plural columnar conductors 110. In this embodiment, the counter electrode layer 130 of the fourth capacitor 10D, which is one of the plural capacitors 10, is electrically connected directly to the support electrode layer 100 of the second capacitor 10B, which is another capacitor 10 positioned most closely to the fourth capacitor 10D at the side of the counter electrode layer 130 of the fourth capacitor 10D in the stacking direction. The counter electrode layer 130 of the fourth capacitor 10D and the support electrode layer 100 of the second capacitor 10B are bonded to each other only with a conductive adhesive 30 interposed therebetween.

That is, in this embodiment, the counter electrode layer 130 of the first capacitor 10A and the support electrode layer 100 of the second capacitor 10B are electrically connected indirectly to each other via the fourth capacitor 10D.

The fifth capacitor 10E is located on one side of the second capacitor 10B, which is one side in the stacking direction of the plural capacitors 10 and which is the extending side of the plural columnar conductors 110. In this embodiment, the counter electrode layer 130 of the second capacitor 10B, which is one of the plural capacitors 10, is electrically connected directly to the support electrode layer 100 of the fifth capacitor 10E, which is another capacitor 10 positioned most closely to the second capacitor 10B at the side of the counter electrode layer 130 of the second capacitor 10B in the stacking direction. The counter electrode layer 130 of the second capacitor 10B and the support electrode layer 100 of the fifth capacitor 10E are bonded to each other only with a conductive adhesive 30 interposed therebetween.

The support electrode layer 100 of the fourth capacitor 10D and the dielectric layer 120 covering this support electrode layer 100 and the support electrode layer 100 of the fifth capacitor 10E and the dielectric layer 120 covering this support electrode layer 100 do not pass through the insulating section 20 and remain on the side of the insulating section 20 closer to the capacitors 10.

The top-surface electrode layer 40 is located at the opposite side of the counter electrode layer 130 of the fifth capacitor 10E as viewed from the support electrode layer 100 of the fifth capacitor 10E, which is the capacitor 10 positioned farther toward the above-described side in the stacking direction than the other capacitors 10. The top-surface electrode layer 40 is electrically connected to the counter electrode layer 130 of the fifth capacitor 10E. The counter electrode layer 130 of the fifth capacitor 10E and the top-surface electrode layer 40 are bonded to each other only with a conductive adhesive 30 interposed therebetween. In this embodiment, the extending direction of the top-surface electrode layer 40 is substantially the same as that of the support electrode layer 100 and the dielectric layer 120 of the first capacitor 10A.

That is, in this embodiment, the counter electrode layer 130 of the second capacitor 10B and the top-surface electrode layer 40 are electrically connected indirectly to each other via the fifth capacitor 10E.

In the composite capacitor 2 according to the second embodiment of the invention, the support electrode layer 100 of the first capacitor 10A and the top-surface electrode layer 40 are electrically connected to each other so as to be used as one terminal. The support electrode layer 100 of the second capacitor 10B can be used as the other terminal.

In the circuit formed from one terminal to the other terminal of the composite capacitor 2 of this embodiment, the fourth capacitor 10D is connected in series with the first capacitor 10A, while the fifth capacitor 10E is connected in series with the second capacitor 10B. A set of the first capacitor 10A and the fourth capacitor 10D and a set of the second capacitor 10B and the fifth capacitor 10E are connected in parallel with each other. In this manner, in the composite capacitor 2 of this embodiment, the four capacitors 10 can be represented by two parallel-connection arrangements×two series-connection arrangements.

In the composite capacitor 2 according to the second embodiment of the invention, too, the second capacitor 10B is connected in parallel with the first capacitor 10A. Moreover, in the composite capacitor 2 according to the second embodiment of the invention, some of the plural capacitors 10 are connected in series with each other, thereby making it possible to enhance the withstand voltage.

Third Embodiment

Hereinafter, a composite capacitor according to a third embodiment of the invention will be described below. The composite capacitor according to the third embodiment of the invention is different from the composite capacitor 1 according to the first embodiment of the invention in that it further includes side conductors. An explanation of elements configured similarly to those of the first embodiment of the invention will not be repeated.

Figure 13:
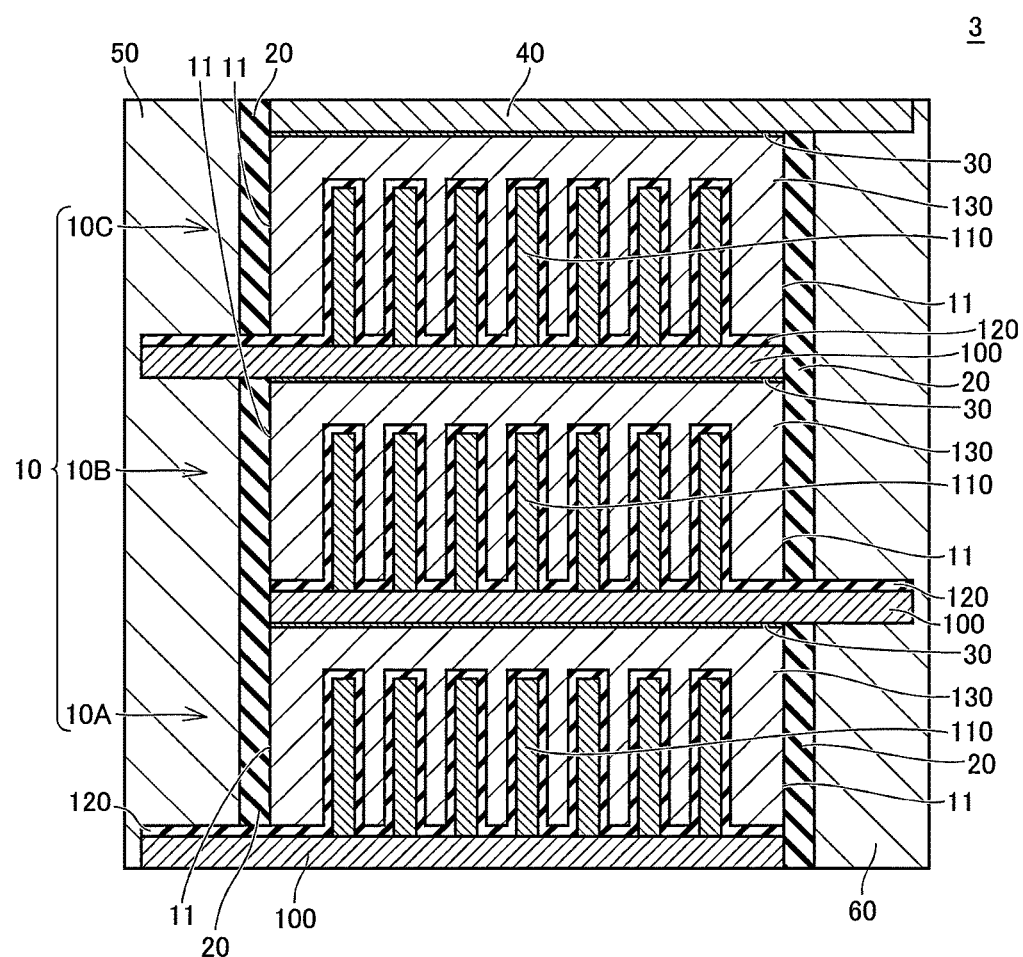
FIG. 13 is a sectional view of a composite capacitor according to a third embodiment of the invention.

FIG. 13 is a sectional view of a composite capacitor according to the third embodiment of the invention. As shown in FIG. 13, a composite capacitor 3 according to the third embodiment of the invention further includes a first side electrode 50 and a second side electrode 60. The first side electrode 50 is provided on the insulating section 20 at an opposite side of the insulating section 20 as viewed from the capacitor 10. The second side electrode 60 is provided on the insulating section 20 at an opposite side of the insulating section 20 as viewed from the capacitor 10 so as to be separate from the first side electrode 50.

The first side electrode 50 is connected to each of the support electrode layer 100 of the first capacitor 10A and the support electrode layer 100 of the third capacitor 10C. The second side electrode 60 is connected to each of the support electrode layer 100 of the second capacitor 10B and the top-surface electrode layer 40.

In this manner, the first side electrode 50 is electrically connected to each of the support electrode layer 100 of the first capacitor 10A and the counter electrode layer 130 of the second capacitor 10B. The second side electrode 60 is electrically connected to each of the counter electrode layer 130 of the first capacitor 10A and the support electrode layer 100 of the second capacitor 10B.

The above-described configuration makes it easy to mount the composite capacitor 3 on a mounting substrate so that the stacking direction of the plural capacitors 10 becomes perpendicular to the mounting substrate. More specifically, when the composite capacitor 3 is mounted in this manner, the first side electrode 50 can serve as one terminal of the composite capacitor 3, while the second side electrode 60 can serve as the other terminal of the composite capacitor 3.

Fourth Embodiment

A composite capacitor according to a fourth embodiment of the invention will be described below. The composite capacitor according to the fourth embodiment of the invention is different from the composite capacitor 3 according to the third embodiment of the invention mainly in that an insulating section surrounds the entirety of one capacitor. An explanation of elements configured similarly to those of the composite capacitor 3 of the third embodiment of the invention will not be repeated.

Figure 14:
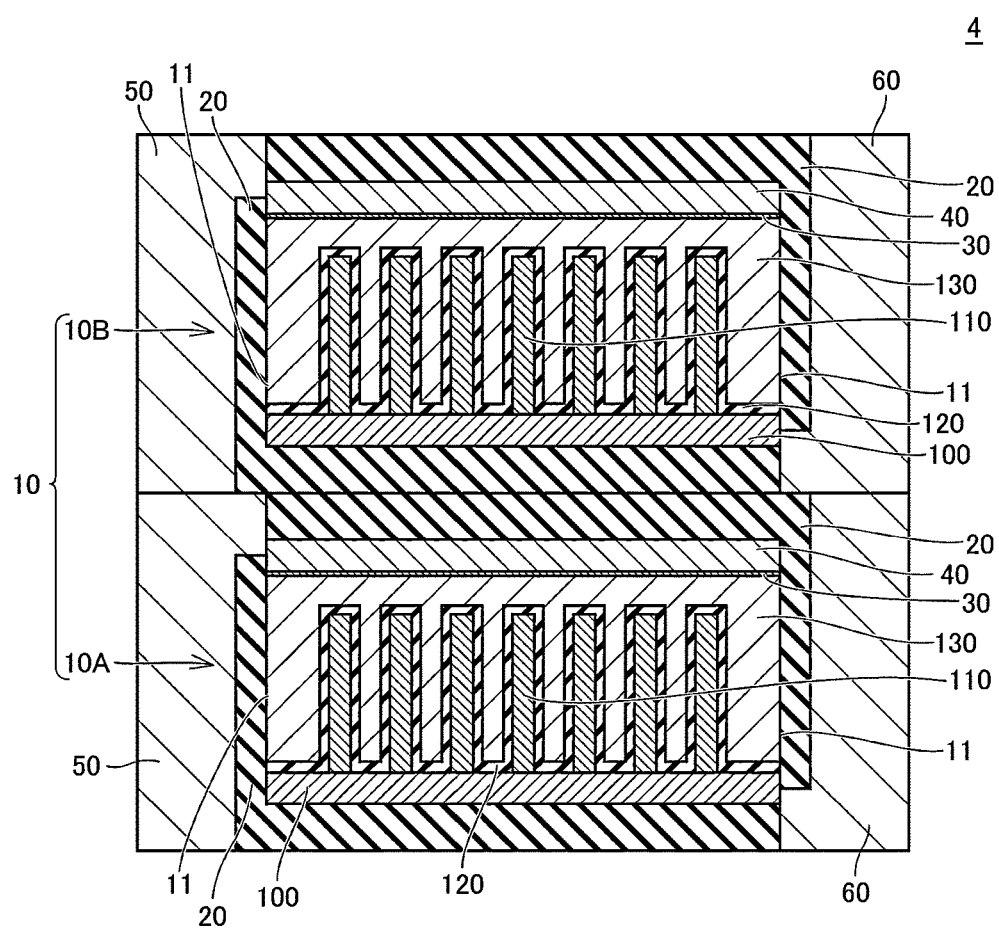
FIG. 14 is a sectional view of a composite capacitor according to a fourth embodiment of the invention.

FIG. 14 is a sectional view of a composite capacitor according to the fourth embodiment of the invention. As shown in FIG. 14, in a composite capacitor 4 according to the fourth embodiment of the invention, plural capacitors 10 have the same configuration.

The composite capacitor 4 according to the present embodiment includes plural top-surface electrode layers 40. Each of the plural top-surface electrode layers 40 is located at the opposite side of the counter electrode layer 130 of a corresponding one of the plural capacitors 10 as viewed from the support electrode layer 100 and is electrically connected to this counter electrode layer 130.

In this embodiment, the insulating sections 20 are disposed to entirely surround the corresponding capacitors 10 and the corresponding top-surface electrode layers 40. Because of this configuration, the insulating section 20 is located between the plural capacitors 10. In each of the plural capacitors 10, however, part of the top-surface electrode layer 40 is not covered with the insulating section 20 and is exposed, and part of the support electrode layer 100 is not covered with the insulating section 20 and is exposed in a direction different from the direction in which the top-surface electrode layer 40 is exposed.

In this embodiment, the first side electrode 50 and the second side electrode 60 are disposed to correspond to each of the plural capacitors 10. In each of the plural capacitors 10, the first side electrode 50 is electrically connected to the top-surface electrode layer 40. The plural first side electrodes 50 are electrically connected to each other. Each of the second side electrodes 60 are electrically connected to the corresponding support electrode layer 100. The plural second side electrodes 60 are electrically connected to each other. With this configuration, in the present embodiment, the second capacitor 10B is connected in parallel with the first capacitor 10A.

In the above-described embodiments, some of the configurations may be combined with each other within a technically possible range.

The above-disclosed embodiments are provided only for the purposes of illustration, but are not intended to be exhaustive or to limit the invention to the precise forms disclosed. It is intended that the scope of the invention be defined, not by the foregoing description, but by the following claims. The scope of the present invention is to be accorded the broadest interpretation so as to encompass all such modifications and equivalent structures and functions.

REFERENCE SIGNS LIST 1, 1a, 2, 3, 4, 9 composite capacitor
10 capacitor
10A first capacitor
10B second capacitor
10C third capacitor
10D fourth capacitor
10E fifth capacitor
11 peripheral surface
20 insulating section
30 conductive adhesive
40 top-surface electrode layer
50 one-side electrode
60 other-side electrode
100 support electrode layer
100X collective support electrode layer
110 columnar conductor
115 end portion
120 dielectric layer
130 counter electrode layer
200 substrate

The invention claimed is:
1. A composite capacitor comprising:
a plurality of capacitors stacked on each other; and
an insulating section that covers peripheral surfaces of the plurality of capacitors about a central axis of the plurality of capacitors, a stacking direction of the plurality of capacitors being a direction of the central axis,
each of the plurality of capacitors including:
a support electrode layer;
a plurality of columnar conductors that extend from a side of the support electrode layer along the stacking direction and that each have a nano-size outer diameter;
a dielectric layer that covers the support electrode layer and the plurality of columnar conductors; and
a counter electrode layer that covers the dielectric layer and that opposes the support electrode layer and the plurality of columnar conductors with the dielectric layer interposed therebetween,
wherein the plurality of capacitors include a first capacitor and a second capacitor connected in parallel with the first capacitor,
wherein the counter electrode layer of the first capacitor is electrically connected to the support electrode layer of the second capacitor, the second capacitor being positioned most closely to the first capacitor at the side of the counter electrode layer of the first capacitor in the stacking direction, and wherein the support electrode layer of first capacitor passes through the insulating section and extends to an opposite side of the insulating section as viewed from the central axis of the plurality of capacitors.

2. The composite capacitor according to claim 1, wherein the support electrode layer of the second capacitor passes through the insulating section and extends to an opposite side of the insulating section as viewed from the central axis of the plurality of capacitors, and in a direction opposite to the support electrode layer of the first capacitor.

3. The composite capacitor according to claim 1, further comprising:
   a first side electrode electrically connected to each of the support electrode layer of the first capacitor and the counter electrode layer of the second capacitor; and
   a second side electrode electrically connected to each of the counter electrode layer of the first capacitor and the support electrode layer of the second capacitor, the second side electrode being separate from the first side electrode.

4. A composite capacitor comprising:
   a plurality of capacitors stacked on each other; and
   an insulating section that covers peripheral surfaces of the plurality of capacitors about a central axis of the plurality of capacitors, a stacking direction of the plurality of capacitors being a direction of the central axis,
   each of the plurality of capacitors including:
      a support electrode layer;
      a plurality of columnar conductors that extend from a side of the support electrode layer along the stacking direction and that each have a nano-size outer diameter;
      a dielectric layer that covers the support electrode layer and the plurality of columnar conductors; and
      a counter electrode layer that covers the dielectric layer and that opposes the support electrode layer and the plurality of columnar conductors with the dielectric layer interposed therebetween,
   wherein the plurality of capacitors include a first capacitor and a second capacitor connected in parallel with the first capacitor,
   wherein the counter electrode layer of the first capacitor is electrically connected to the support electrode layer of the second capacitor, the second capacitor being positioned most closely to the first capacitor at the side of the counter electrode layer of the first capacitor in the stacking direction, and
   wherein the support electrode layer of the second capacitor passes through the insulating section and extends to an opposite side of the insulating section as viewed from the central axis of the plurality of capacitors.

5. A composite capacitor comprising:
   a plurality of capacitors stacked on each other; and
   an insulating section that covers peripheral surfaces of the plurality of capacitors about a central axis of the plurality of capacitors, a stacking direction of the plurality of capacitors being a direction of the central axis,
   each of the plurality of capacitors including:
      a support electrode layer;
      a plurality of columnar conductors that extend from a side of the support electrode layer along the stacking direction and that each have a nano-size outer diameter;
      a dielectric layer that covers the support electrode layer and the plurality of columnar conductors; and
      a counter electrode layer that covers the dielectric layer and that opposes the support electrode layer and the plurality of columnar conductors with the dielectric layer interposed therebetween,
   wherein the plurality of capacitors include a first capacitor and a second capacitor connected in parallel with the first capacitor,
   wherein the counter electrode layer of the first capacitor is electrically connected to the support electrode layer of the second capacitor, the second capacitor being positioned most closely to the first capacitor at the side of the counter electrode layer of the first capacitor in the stacking direction, and
   wherein the plurality of columnar conductors are formed of carbon nanotubes.

6. A composite capacitor comprising:
   a plurality of capacitors stacked on each other; and
   an insulating section that covers peripheral surfaces of the plurality of capacitors about a central axis of the plurality of capacitors, a stacking direction of the plurality of capacitors being a direction of the central axis,
   each of the plurality of capacitors including:
      a support electrode layer;
      a plurality of columnar conductors that extend from a side of the support electrode layer along the stacking direction and that each have a nano-size outer diameter;
      a dielectric layer that covers the support electrode layer and the plurality of columnar conductors; and
      a counter electrode layer that covers the dielectric layer and that opposes the support electrode layer and the plurality of columnar conductors with the dielectric layer interposed therebetween,
   wherein the plurality of capacitors include a first capacitor and a second capacitor connected in parallel with the first capacitor,
   wherein the counter electrode layer of the first capacitor is electrically connected to the support electrode layer of the second capacitor, the second capacitor being positioned most closely to the first capacitor at the side of the counter electrode layer of the first capacitor in the stacking direction, and
   wherein the plurality of capacitors further include a third capacitor between the first capacitor and the second capacitor, the third capacitor being connected in series with the first capacitor.

7. The composite capacitor according to claim 6, wherein the counter electrode layer of the first capacitor is electrically connected directly to the support electrode layer of the third capacitor.

8. The composite capacitor according to claim 7, wherein the counter electrode layer of the third capacitor is electrically connected directly to the support electrode layer of the second capacitor.

9. The composite capacitor according to claim 6, wherein the counter electrode layer of the first capacitor and the support electrode layer of the second capacitor are electrically connected indirectly to each other via the third capacitor.

* * * * *